(12) United States Patent
Pozarycki

(10) Patent No.: US 7,945,638 B2
(45) Date of Patent: May 17, 2011

(54) UBIQUITOUS CONTENT SUBSCRIPTION AND DELIVERY VIA A SMART ELECTRONIC PAPER DEVICE

(75) Inventor: Steven Pozarycki, Morris Plains, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 438 days.

(21) Appl. No.: 11/750,258

(22) Filed: May 17, 2007

(65) Prior Publication Data
US 2008/0288579 A1 Nov. 20, 2008

(51) Int. Cl.
*G06F 15/16* (2006.01)
(52) U.S. Cl. ......................... 709/217; 709/250
(58) Field of Classification Search ............... 709/217, 709/250; 345/206
See application file for complete search history.

(56) References Cited

U.S. PATENT DOCUMENTS

| | | | |
|---|---|---|---|
| 6,279,013 B1 * | 8/2001 | LaMarca et al. | 715/210 |
| 6,622,015 B1 * | 9/2003 | Himmel et al. | 455/414.1 |
| 6,732,139 B1 | 5/2004 | Dillenberger et al. | |
| 7,050,835 B2 * | 5/2006 | Hack et al. | 455/566 |
| 2002/0015019 A1 * | 2/2002 | Kinjo | 345/156 |
| 2002/0055938 A1 * | 5/2002 | Matsuo et al. | 707/104.1 |
| 2003/0234777 A1 * | 12/2003 | Wampler | 345/204 |
| 2004/0041800 A1 * | 3/2004 | Daniels | 345/204 |
| 2004/0155833 A1 * | 8/2004 | Ishii et al. | 345/1.1 |
| 2004/0198438 A1 * | 10/2004 | Song et al. | 455/556.1 |
| 2004/0217877 A1 * | 11/2004 | Kokonaski et al. | 340/815.4 |
| 2007/0180450 A1 * | 8/2007 | Croft et al. | 718/1 |
| 2007/0247422 A1 * | 10/2007 | Vertegaal et al. | 345/156 |

OTHER PUBLICATIONS

Nishkam et al.; "Portable smart messages for ubiquitous Java-enabled devices"; Aug. 22-26, 2004; The First Annual International Conference on Mobile and Ubiquitous Systems: Networking and Services, 2004. MOBIQUITOUS 2004.*
Huai et al.; "CIVIC: a Hypervisor based Virtual Computing Environment"; 2007 International Conference on Parallel Processing Workshops (ICPPW 2007); Sep. 10-14, 2007.*
Huang et al.; "A Case for High Performance Computing with virtual machines"; International Conference on Supercomputing, Proceedings of the 20th annual international conference on Supercomputing; Session: High performance computing—supercomputing; pp. 125-134; Year of Publication: 2006.*
Vmware; VMware ESX server: Platform for virtualizing servers, storage and networking; product sheet, retrieved through Wayback Machine dated Apr. 20, 2007.*
Fraser et al., The Xenoserver Computing Infrastructure, IEEE, 2002, pp. 1-8. Huang et al., A Case for High Performance Computing With Virtual Machines, ACM, Jun. 2006, pp. 125-134.
Hand et al., Controlling the Xenoserver Open Platform, IEEE, 2003, pp. 3-10.

* cited by examiner

*Primary Examiner* — Andrew Caldwell
*Assistant Examiner* — Lin Liu
(74) *Attorney, Agent, or Firm* — Fliesler Meyer LLP

(57) ABSTRACT

A portable electronic paper device can include a flexible display substrate for displaying dynamic content received from a content provider. The device can also include a CPU, memory storage and a wireless communication component for establishing a connection with the content provider. The memory of the device can be loaded with software needed to display the content, such as a hypervisor, a virtual machine and an interface layer between them such that no operating system is required in order to render content onto the flexible display. The electronic device can be distributed to users from the content provider and loaded with an application deployed on the virtual machine to display and personalize the content. Periodic updates can be transmitted from the content provider to the device thereby enabling real-time updatable content delivery to the users.

14 Claims, 5 Drawing Sheets

UBIQUITOUS CONTENT SUBSCRIPTION AND DELIVERY VIA A SMART ELECTRONIC PAPER DEVICE

CROSS REFERENCE TO RELATED APPLICATIONS

The following commonly owned, co-pending U.S. patent applications are related to the present application and are incorporated by reference herein in their entirety:

U.S. Provisional Patent Application No. 60/821,673, entitled "SYSTEM AND METHOD FOR PROVIDING HARDWARE VIRTUALIZATION IN A VIRTUAL MACHINE ENVIRONMENT", by Joakim Dahlstedt, filed on Aug. 7, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to content data delivery and electronic devices and more particularly to delivering dynamic and real-time content to users via a smart electronic paper device.

BACKGROUND

Electronic news and content are well known and have become a standard in the field of communications and the delivery and distribution of information to mass users. The vast majority of companies and individuals today access news content and other data either physically (e.g. newspapers and magazines) or electronically (e.g. online streaming news). Traditionally newspapers and magazines have been delivered via mail or door-to-door delivery, every morning or monthly. This traditional form of content distribution has posed a set of problems and inconveniences, however, in that the information is usually updated with significant delay (daily, monthly, etc.) as well as the various costs and efforts associated with printing, mailing and delivering the content.

In the more recent times, news has been increasingly accessed by using a computer logged into a network such as the internet. However, this form of information delivery has its own limitations, such as the requirements of owning and knowing how to use a computer (laptop, personal digital assistant (PDA), etc.), connecting to the internet, searching for relevant news and the time taken to execute these various tasks. Furthermore, users are not typically provided with the traditional flexibility and look and feel of a newspaper or magazine which they can pick up, read and then casually place at any location within the home.

In light of all of the above, it would be advantageous to provide systems and methods that address the issue of delivering news in real-time via 21$^{st}$ century technology, while still giving the end-user the "feel and look" of using a traditional newspaper or magazine. Furthermore, a way to provide news and articles simultaneously to a younger as well as older generation of users is desirable. It can also be advantageous to increase the revenue of content providers by decreasing costs, increasing subscriptions, ads and ad rates and providing various other advantages.

DETAILED DESCRIPTION

Figure 1:
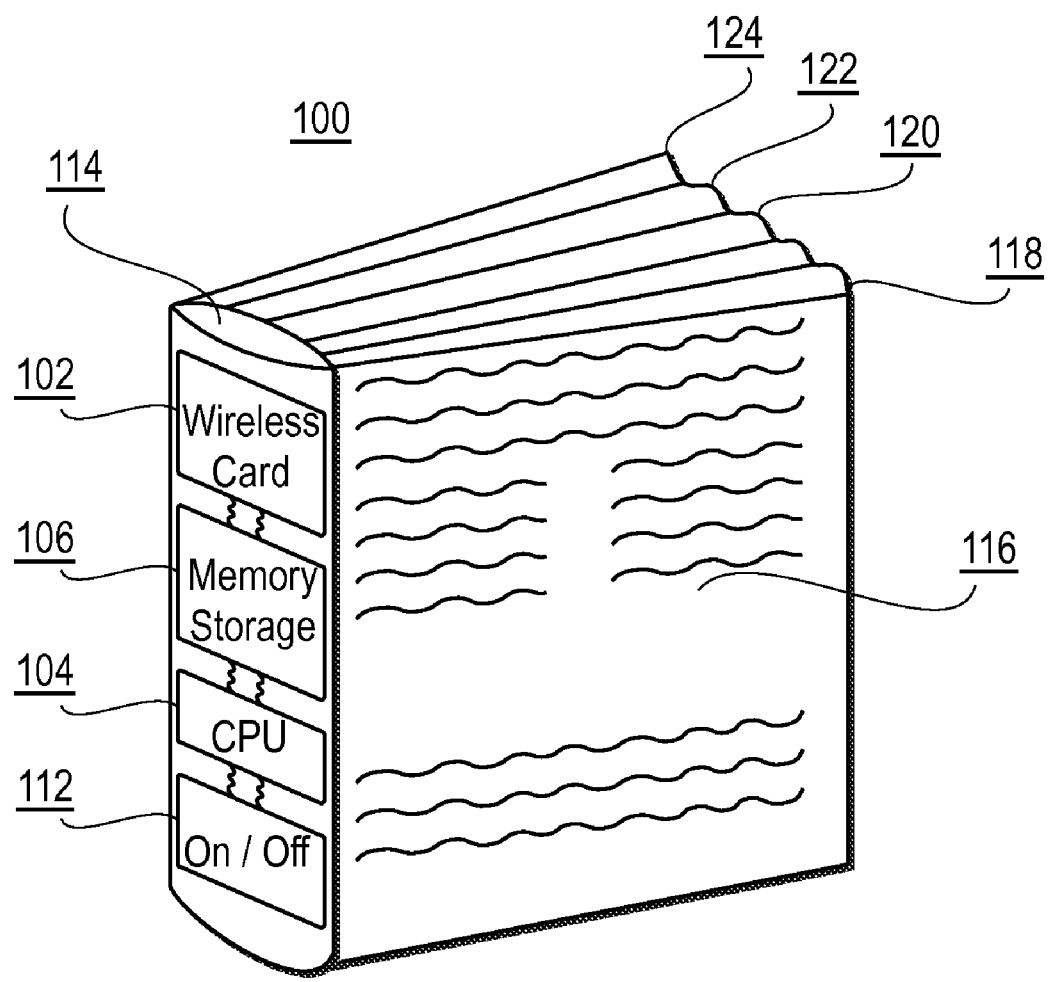
FIG. 1 is an exemplary illustration of the electronic paper device that can be used in accordance with various embodiments of the present invention.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in an accessible device or appliance with storage capacity. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided systems and methods for ubiquitous content subscription and delivery via a smart electronic paper device. These systems and methods can be used in various processes for delivering dynamic content such as news stories and articles to a home or business environment. A smart electronic paper device is described, which can implement a flexible display substrate that looks and feels like a standard newspaper or magazine (i.e. bendable, movable, etc.). The display substrate can be used by the device to display the dynamic content received from various providers. The electronic device can also include an on/off switch, a wireless communication card, a central processing unit (CPU) and a small hard disk or other type of memory storage embedded inside.

A content provider, such as a newspaper can distribute such smart electronic devices to its customers who can in turn subscribe to receive real-time electronic news and updates from the provider. Once activated by the user, the device can start an embedded application and begin receiving authorized or subscribed to content over the wireless network card. The content can be rendered onto the flexible display, thereby providing the user the look and feel of a real-time self-updating newspaper or magazine.

The device can be provided at little or no cost from the content vendor and the cost could be made up in the service fees which can be charged monthly. Alternatively, the content provider can sell the device for those customers who are interested, while continuing regular subscriptions for others. Effectively, costs of printing, mailing and delivering physical content can be reduced or eliminated by switching to this form of content subscription. The actual cost of the device can be a one-time fee only and if the device is lost by the consumer, a replacement device may have an associated charge.

Users can subscribe their electronic paper devices to various news channels and topics by using the internet, telecommunications or regular mail. For example, one user may subscribe to receive the news on various topics, while another user may wish to receive various magazine-type articles of a particular subject matter. The same electronic device can be registered for any such topic by both users. Because each electronic paper device can be assigned a unique identifier, the content provider can customize the data which is delivered to the particular device on a per-user or a per-household basis.

One or more software programs can be deployed on the memory storage of the electronic device and these software programs can perform various functionality, such as customizing, organizing and displaying the content received from providers. In some embodiments, the software programs can include a hypervisor, a virtualization layer, a personalization engine and an application in order to display the content data. In certain of these embodiments, no operating system is necessary, as the hypervisor and the virtual machine can be made aware of each other. Via removing the operating system layer, performance can be improved by reducing the required storage capacity, reducing latency, and achieving higher synchronization of various processes between the application, virtual machine and the hypervisor.

FIG. 1 is an exemplary illustration of the electronic paper device that can be used in accordance with various embodiments of the present invention. Although this diagram depicts components as logically separate, such depiction is merely for illustrative purposes. It will be apparent to those skilled in the art that the components portrayed in this figure can be arbitrarily combined or divided into separate hardware, or can be distributed among different computing devices, or connected by one or more networks or other suitable communication means.

As illustrated, in the preferred embodiment, the electronic paper device 100 can include a hard binding 114 and one or more pages 118, 120, 122, 124 made of flexible display substrate (also referred to herein as electronic paper). This electronic paper can be made of a flexible display material, such as a plastic polymer, which has been developed and is currently being advanced by companies such as the Xerox Palo Alto Research Center (PARC) and Cambrios Techonologies Corp. In one embodiment, "gyricon" technology developed at PARC can be implemented to construct the flexible substrate. Gyricon technology utilizes a thin, transparent and flexible plastic sheet which includes a plurality of tiny beads that can be of two contrasting colors. Electric charge can be applied to such beads in order to rotate them and cause one of the contrasting colors to be displayed to the viewer. Once this charge has been applied, the beads will remain in that state until a new charge is applied. Thus, by applying electricity at various points of the sheet, the flexible display substrate can be manipulated to render content such as text or images thereon. In this manner, the flexible substrate functions as a display monitor that has a similar look and feel to paper, but can be reused and updated numerous times via electronic manipulation. It should be noted that the present invention is not intended to be limited to gyricon technology, and various other forms of display substrate can also be utilized within the scope of alternative embodiments.

In various embodiments, the hardware binding 114 is physically coupled to the plurality of pages 118, 120, 122, 124 in order to allow the user to manipulate the electronic paper device by flipping or turning pages, such as in a typical magazine, newspaper or book. In one embodiment, the hardware binding 114 includes an on/off switch 112, a wireless card 102 and other electronic hardware circuitry that can perform various operations such as input/output, display, sound and other processing functions. In one embodiment, the hardware circuitry includes an Intel-type central processing unit (CPU) 104 and a storage medium 106 such as random access memory (RAM), a hard disk or some another type of computer memory storage. In certain embodiments, it is preferable that all of the hardware be made physically small and space efficient enough to fit onto the binding of the electronic device, so as not to interfere with a desirable look and feel of a typical newspaper or magazine. In other embodiments, however, it is possible to include the hardware components into the actual pages (e.g. corner of the page) of the electronic device or to situate at least some of the components remotely with respect to the device.

The CPU and other electronic circuitry can apply electrical charges to the appropriate places on the flexible display in order to render the dynamic content as text or images. In one embodiment, the text can be easily adjusted to be larger or smaller for users with visual impairments. In this manner, not only the content, but also the display of the content on the flexible screen can be customized for each particular user.

A clearinghouse company (also referred to herein as a content provider) can create the electronic paper device and install a hard-coded unique identifier into the memory of the device before providing it to the users. In one embodiment, a media access control (MAC) address and/or an internet protocol (IP) address can be assigned to the electronic device in order to uniquely identify it over other such devices. A server on the clearinghouse domain can then associate various types of content with each electronic paper device, possibly based on the specific subscriptions registered by the user. This "subscribed to" content can be periodically (e.g. by the minute) delivered to the user's device, thereby enabling real-time updates of information and news.

Figure 2:
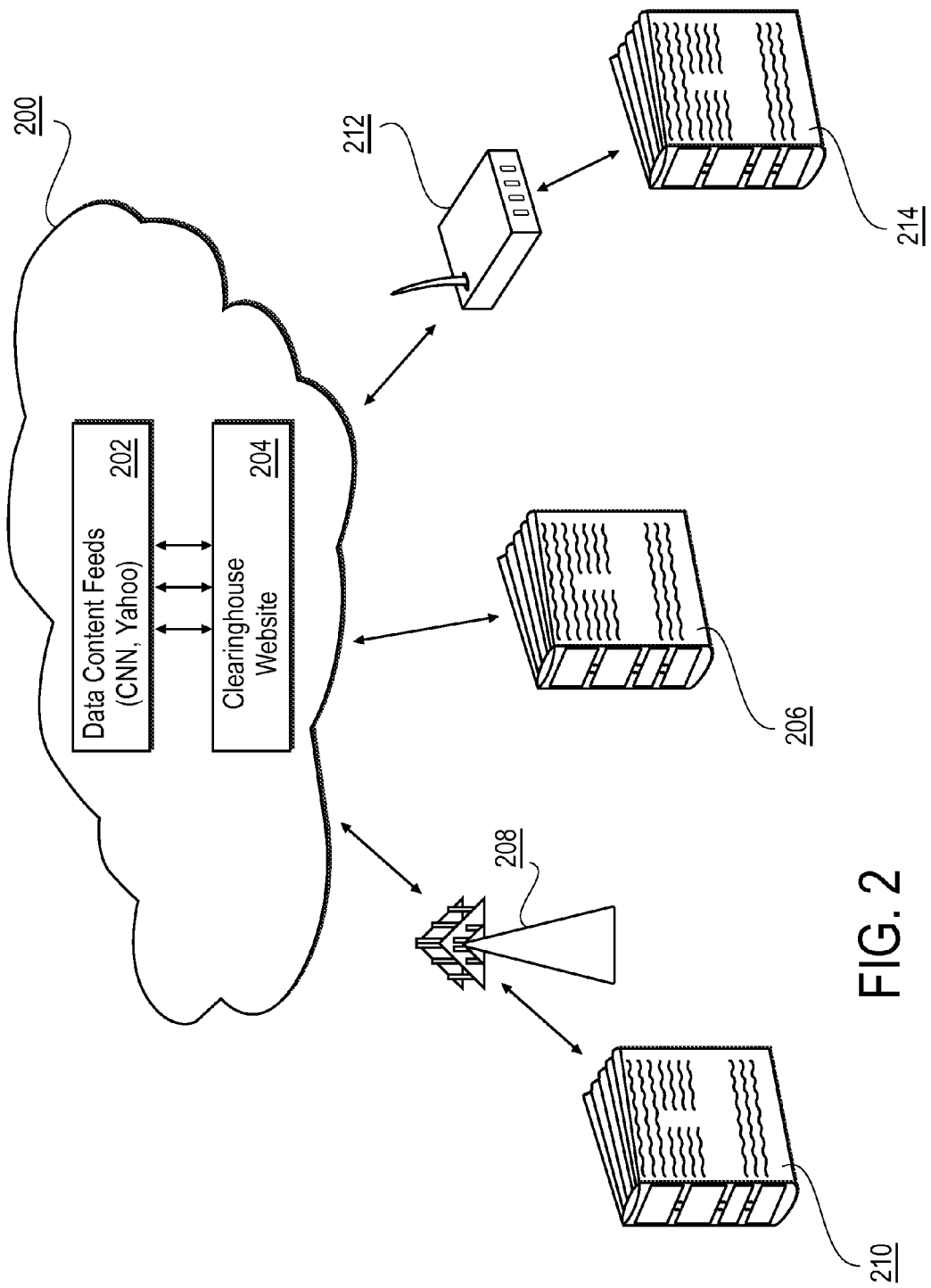
FIG. 2 is an exemplary illustration of the distribution of electronic paper devices in accordance with various embodiments of the present invention.

FIG. 2 is an exemplary illustration of the distribution of electronic paper devices in accordance with various embodiments of the present invention. Although this diagram depicts components as logically separate, such depiction is merely for illustrative purposes. It will be apparent to those skilled in the art that the components portrayed in this figure can be arbitrarily combined or divided into separate hardware, or can be distributed among different computing devices, or connected by one or more networks or other suitable communication means.

As illustrated, one or more electronic paper devices 206, 210, 214, can be connected to a network such as the internet 200. In the preferred embodiment, the connection to the internet 200 is achieved by implementing a wireless communication component. Wireless forms of communication include radio frequency (RF) based transmissions, such as Wifi, Bluetooth, NFC, cellular telecommunications and other forms of data transmission. In other embodiments, wired forms of communication can also be implemented.

In many cases, the electronic device can connect to the internet via an intermediary access point such as a cellular telecommunication transmission tower 208 or a home/business internet access point 212. Examples of such access points include routers, network hubs, personal computers, media gateways, cellular telephones and other intermediary devices capable of establishing a connection to the internet The clearinghouse content provider can maintain an internet website 204 where subscribers can register for content such as books, magazines, news and other information. In some embodiments, the content can be pulled via RSS feeds specified via XML or other means from third party data content feeds 202 such as news provider website. Thus, the clearinghouse can but need not necessarily provide the content itself.

Once the electronic devices have been distributed, the users can begin receiving updates from the content provider periodically or in real-time. For example, a user can subscribe to real-time news which is updated by the minute. As another illustration, the user can download a book or a portion thereof to the electronic paper device. If the text of an entire book is too large to display at once on the device, a subset of the pages can be downloaded first and once the user has finished reading that subset, the next subset can be downloaded, and so forth.

Figure 3:
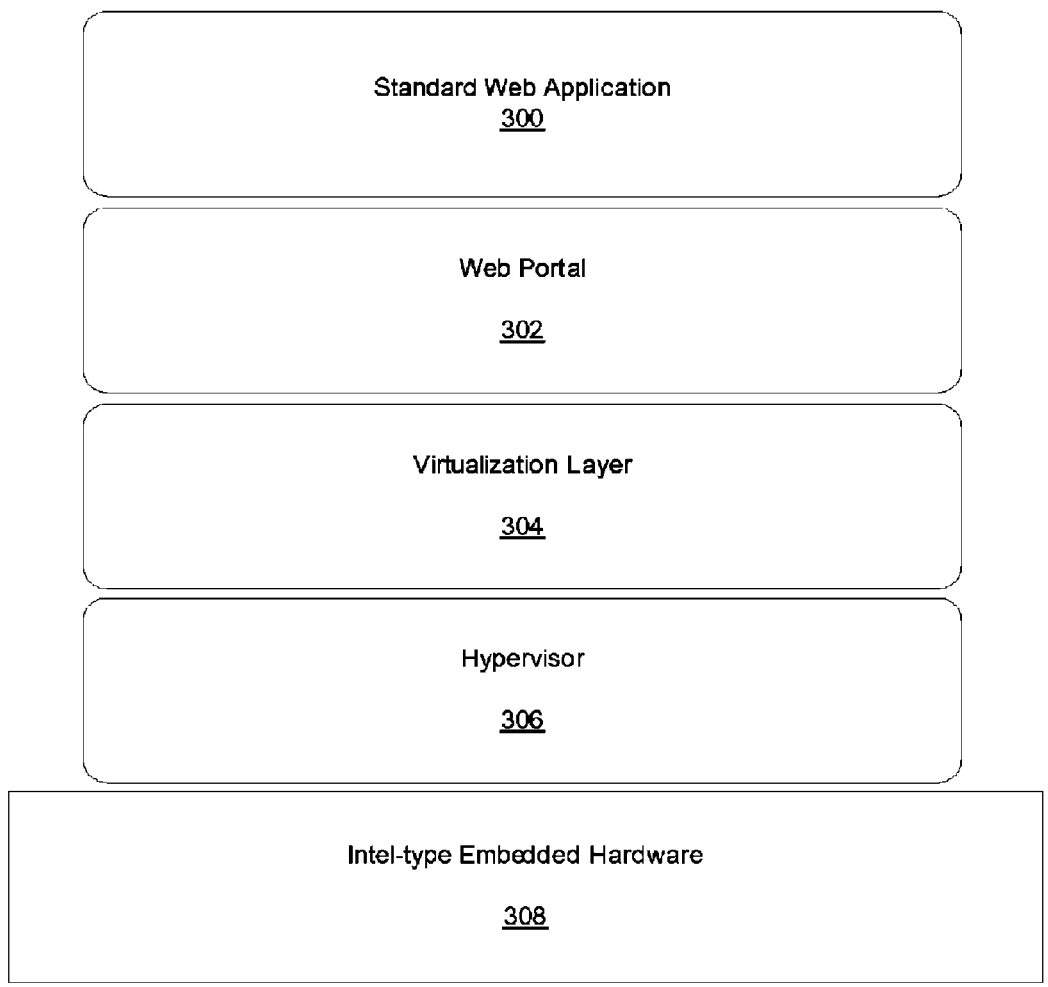
FIG. 3 is an exemplary illustration of the software layers that can be used in accordance with various embodiments of the present invention.

FIG. 3 is an exemplary illustration of the software layers that can be used in accordance with various embodiments of the present invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the Intel-type embedded hardware 308 of the device can be installed with a set of instructions to execute various software applications. In one embodiment, the set of instructions includes a hypervisor 306, a virtualization layer 304 and standard web application such as a Java application 300 to render dynamic content received from the content providers. Various embodiments also include a personalization engine web portal 302, such as the WebLogic Portal, available from BEA Systems Inc.

In various embodiments, the hypervisor 306 and the virtualization layer 304 are utilized in order to remove the requirement of a complete operating system residing on the electronic circuitry of the electronic paper device. In many cases, it is desirable that the hardware be kept relatively small in size and weight and it may be inefficient to deploy an entire operating system onto the electronic paper device. In alternative embodiments, however, the electronic paper device includes an operating system as well as other software or hardware features, and the present invention is not intended to be limited to the particular embodiment illustrated herein.

In the case of typical computer implementations, the hardware layer is controlled by the operating system which executes low level hardware operations as well as manages various applications and other software programs. Often, the operating system has a virtual machine deployed thereon, such as the Java Virtual Machine (JVM), which executes various applications for the operating system. For example, the JVM interprets and executes Java byte code which has been generated by a compiler. As such, in the usual scenario, a software application is executed by the JVM which is running on top of an operating system, which is in turn running on top of the hardware layer.

A hypervisor 306 is software that has been developed to run on top of the hardware layer and manage one or more operating systems. Examples of such hypervisors are provided by VMWare, Inc., Xen or by various third parties implementing the Xen Open Source Solution. Thus, in a typical scenario where a hypervisor is used, the "guest" operating system runs on a level above the hypervisor which is executing directly above the hardware layer. In essence, the hypervisor is a more basic and boiled down version of an operating system which provides the critical functionality needed to access the hardware. As such, by using the hypervisor, hardware can be virtualized by having several different operating systems deployed on one physical machine.

In one embodiment, the operating system can be removed from the layers needed to run a software program, such as a web application. This can be done by directly implementing the virtual machine on top of the hypervisor and then deploying various applications onto that virtual machine. This eliminates a layer needed to execute a software application and in certain cases, this can decrease latency and improve performance. For example, the BEA Systems, Inc. "Bare Metal" solution optimizes the Java server technology by implementing a hypervisor and removing the operating system layer. More details about this feature can be found in U.S. Patent Application No. 60/821,673, which is incorporated herein by reference in its entirety.

Operating systems are typically designed for multi-user and multi-process environments. However, in certain embodiments of the electronic paper device, it may be that only one process (e.g. a JVM) or one application need be running on the device at any given period of time. Accordingly, the operating system becomes unnecessary to an extent and may possibly even hinder the performance of that process. If the operating system layer is removed, the application can be better optimized by having all of the garbage collection be synchronized, as one example.

In certain embodiments, the electronic paper device can also benefit from such an optimization by saving on the storage space and redundancies which may be present in the large and slow general purpose operating system. For example, garbage collection, swapping, thread management and various other features are often performed by both the operating system and the JVM, and in many cases they are uncoordinated with one another, thereby causing redundancies and unnecessary latency. Furthermore, operating systems typically require a large memory storage and processor capacity, which may be undesirable in a small paper-like electronic device. By removing the operating system and by making the hypervisor and the virtual machine aware of each other, these features can be improved and optimized for maximum performance.

In various embodiments, removing the operating system layer and making the JVM and the hypervisor aware of each other can require a thin interface layer in order to enable the two layers to function properly. As one example, this interface layer can provide the device drivers for talking on the network or writing and reading (I/O) to memory, such as a disk. This interface can also provide context switching, thread scheduling, TCP/IP stack, and the standard libraries that the JVM needs to function. This interface layer can be a very thin platform that merely enables and optimizes the functionality provided by the virtual machine. In one embodiment, the "Bare Metal" product, available from BEA Systems Inc., can provide such a platform.

Continuing with the illustration, the application server or web portal server 302 can be running on top of the JVM, which enables display and personalization of various content. The display and delivery of content can be customized to each user by using the personalization engine such as a web portal. There are two levels of personalization of content that can be performed in accordance with various embodiments. At a first level, personalization of content can occur at the remote server level (i.e. at the content provider) by determining which content to deliver to a user based on his preferences, as well as determining how that content will be organized prior to delivery. At the second level, the content display can be customized on the electronic device itself. For example, a user may wish to enable the device to display electronic news on pages 1-4 of the device and his favorite portions of a magazine on pages 5-10. Furthermore, the display of the actual text and images can be customized, such as by increasing the size, font, language or the layout format of the text rendered on the flexible screen. In one embodiment, the user can log in to the clearinghouse website in order to personalize the content on the device, or the content can be automatically personalized by the server for the user. In other embodiments, the content can be personalized locally, by using the device itself.

As an enhancement to the software loaded on the device, the Java Speech Application Programming Interface (JSAPI) can be utilized for the visually impaired users. The Java Speech API allows incorporation of speech technology into user interfaces of applets and applications and is currently being targeted to the Java 2 Micro Edition (J2ME) as well as other such platforms. A JSAPI compliant engine could be used by the electronic device to support speech synthesizing, control and command recognition and various dictation systems.

Figure 4:
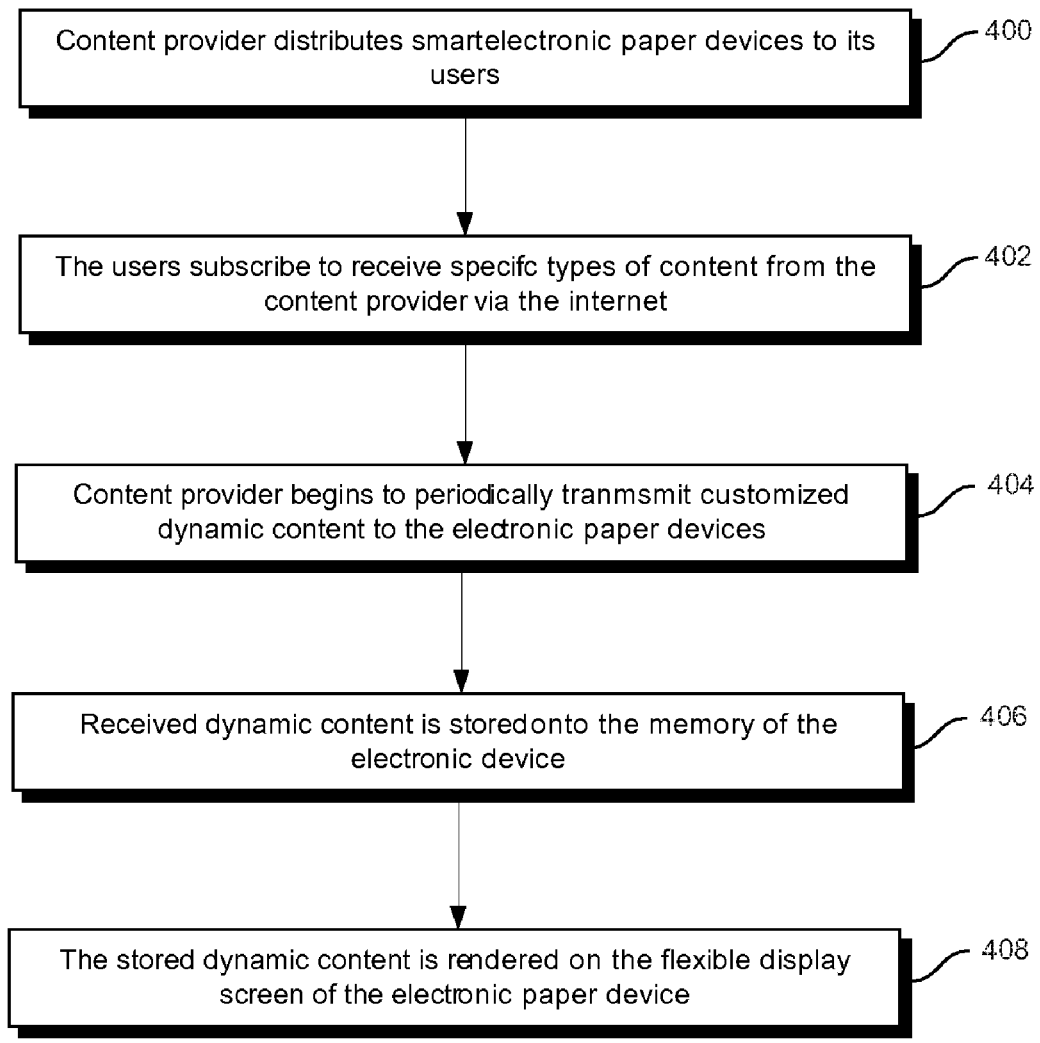
FIG. 4 is an exemplary flow diagram of the general process, in accordance with various embodiments.

FIG. 4 is an exemplary flow diagram of the general process, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As shown in step 400, a content provider can distribute the electronic paper devices to its users once, rather than daily or monthly, as in the case of newspapers or magazines. In step 402, the users who have received the device can register it via the internet in order to receive personalized content from the provider. In step 404, the content provider can then continuously or periodically transmit content that is customized to each electronic device. In step 406, the content can be received and stored in the memory storage component of the device. In step 408, the stored content can then be rendered on the flexible display of the device, thereby effectively providing a real-time self-updating newspaper, magazine or book.

Figure 5:
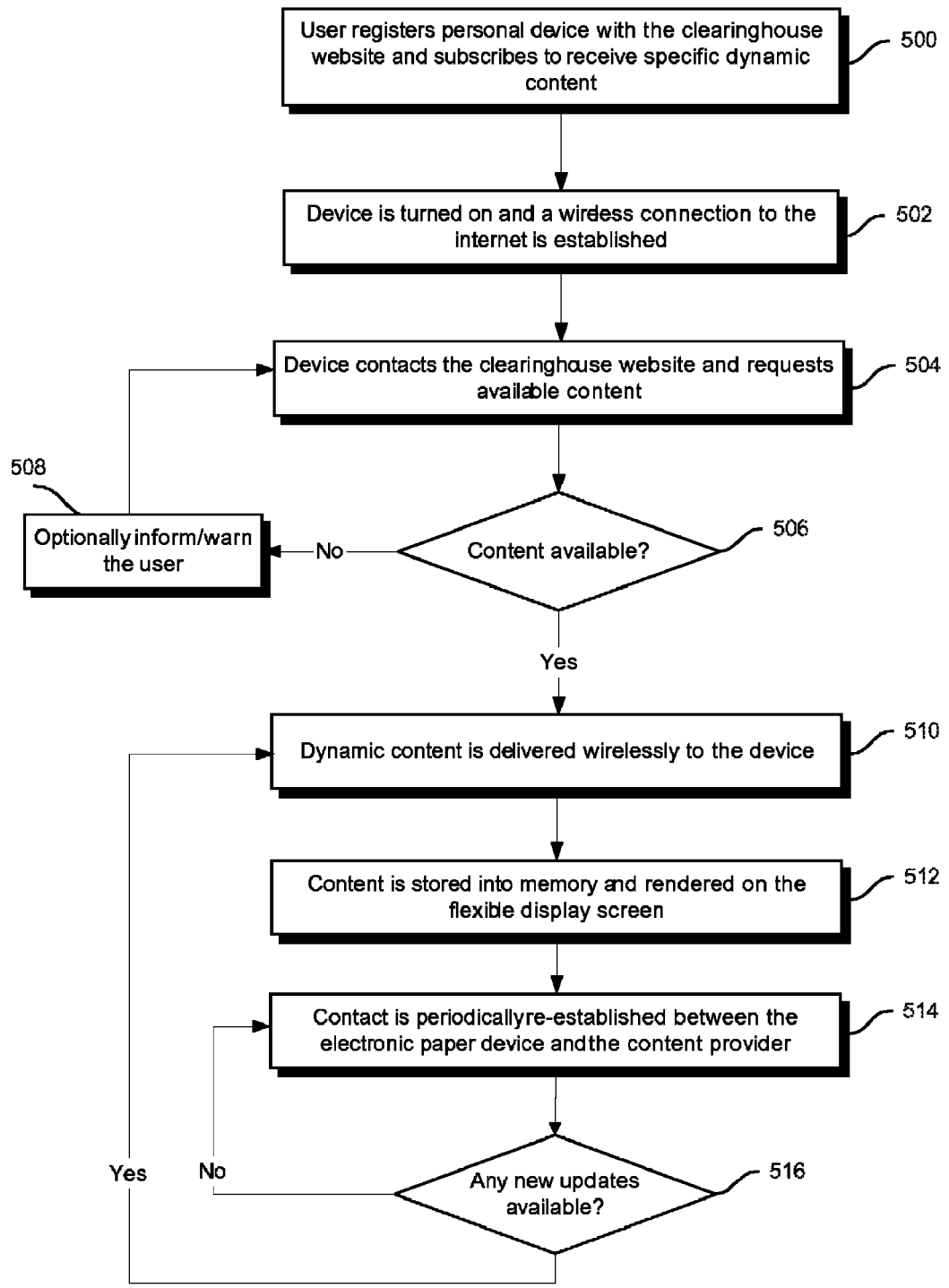
FIG. 5 is an exemplary flow diagram of the process from the perspective of a single electronic device, in accordance with various embodiments.

FIG. 5 is an exemplary flow diagram of the process from the perspective of a single electronic device, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As shown in step 500, a user can register his or her personal electronic paper device with a clearinghouse website. At the same time, the user can subscribe to the various types of content via the website. In step 502, once the device is turned on, a wireless connection can be established to the internet and in step 504, the device can contact the content provider via the internet and request for any available content. If in step 506, it is determined that no content is currently available, the user can be thus informed, such as by displaying a warning or error message, in step 508. If content is available, it can be downloaded wirelessly to the electronic device, as shown in step 5 10. Similarly, the content can be stored in the memory of the device and rendered onto the flexible display substrate in step 512. Subsequently, contact can be periodically reestablished between the device and the content provider in step 514. This can be either performed by the device periodically querying the content server for new updates, or alternatively, the server itself can push the information down to the electronic device. Thus, periodically (e.g. every second(s), minute(s), hour(s), etc.) or whenever new updates become available 516, the updates can be downloaded to the device thereby enabling real-time and dynamic content distribution.

Various embodiments of the invention include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information.

Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. An electronic data delivery apparatus for delivering a set of streaming content to one or more users, said apparatus comprising:

a hardware binding and one or more pages coupled to said binding, wherein said one or more pages are capable of being turned around the hardware binding;

a flexible substrate adapted to display said set of streaming content, wherein each page is made of the flexible substrate and displays the set of streaming content, and wherein each page is a thin, transparent and flexible plastic sheet which includes a plurality of beads that can be of two contrasting colors depending on an applied electric charge to the plurality of beads;

a wireless communication component adapted to establish a connection with one or more content providers and electronically receive the set of streaming content from said one or more content providers, wherein the electronic data delivery apparatus is associated with a unique identifier, and wherein said unique identifier is used by the one or more content providers to establish the connection with the wireless communication component to send the set of streaming content;

a storage medium adapted to store said set of streaming content received via the wireless communication component;

a central processor unit (CPU) adapted to read said set of streaming content from the storage medium and cause the set of streaming content to be displayed on said flexible substrate for viewing by the one or more users;

wherein the wireless communication component, the storage medium and the CPU are situated within the hardware binding;

wherein the electronic data delivery apparatus is a handheld mobile device distributable to the one or more users, such that the set of streaming content received from the one or more content providers is rendered on the flexible substrate in a specific customized display form tailored for a particular user associated with the electronic data delivery apparatus;

a virtual machine adapted to provide at least one application for rendering the set of streaming content;

a hypervisor that directly interfaces with the virtual machine to execute the at least one application by the CPU; and a personalization engine adapted to customize the streaming content for the one or more users based on a set of preferences received from each one of the one or more users, wherein the streaming content is displayed on the flexible substrate in a format enforced by the personalization engine.

2. The electronic data delivery apparatus of claim 1 wherein:

the hypervisor runs directly above a hardware layer, wherein the hypervisor operates to eliminate the need for an operating system (OS) on the electronic data delivery apparatus, said hypervisor comprising a thin interface that directly connects the hardware layer and a Java Virtual Machine (JVM), the thin interface providing one or more of the following: device drivers for communicating over a network, device drivers for reading and writing input/output (I/O) operations in physical storage memory, context switching, thread scheduling, transmission control protocol and internet protocol (TCP/IP) stack and a set of standard libraries for the JVM.

3. The electronic data delivery apparatus of claim 1 wherein said wireless communication component establishes the connection with the one or more content providers via an intermediary device that includes at least one of:

a digital subscriber line (DSL) transceiver, a cable modem, a network bridge, an Ethernet gateway, a wireless network hub, a router, a cellular telecommunications site, a cellular telephone and a computer.

4. The electronic data delivery apparatus of claim 1 wherein said one or more content providers deliver the set of streaming content via a rich site summary (RSS) feed.

5. The electronic data delivery apparatus of claim 1 wherein said one or more users subscribe to receive the set of streaming content from said one or more content providers.

6. The electronic data delivery apparatus of claim 1 wherein the set of streaming content on said storage medium is periodically updated by the one or more content providers.

7. A system for delivering dynamic content to one or more users, said system comprising:

an electronic data delivery apparatus that is handheld and mobile having a hardware binding and one or more pages coupled to said binding, wherein said one or more pages are capable of being turned around the hardware binding, said data delivery apparatus being distributable to one or more users, such that a set of streaming content received from one or more content providers is rendered on a flexible substrate of said electronic data delivery apparatus in a specific customized display form tailored for a particular user associated with the electronic data delivery apparatus, wherein each page is made of the flexible substrate and displays the set of streaming content, and wherein each page is a thin, transparent and flexible plastic sheet which includes a plurality of beads that can be of two contrasting colors depending on an applied electric charge to the plurality of beads, wherein the electronic data delivery apparatus is associated with a unique identifier, and wherein said unique identifier is used by the one or more content providers to establish the connection with a wireless communication component to send the set of streaming content, and wherein the electronic data delivery device further includes a central processing unit (CPU) and a storage medium containing a set of instructions for controlling said CPU situated within the hardware binding, said set of instructions including:

a hypervisor that operates to eliminate the need for an operating system (OS) on the electronic data delivery apparatus, said hypervisor comprising a thin interface that directly connects a hardware layer of the electronic data delivery apparatus to a Java Virtual Machine (JVM), the thin interface providing one or more of the following: device drivers for communicating over a network, device drivers for reading and writing input/output (I/O) operations in the storage medium, context switching, thread scheduling, transmission control protocol and internet protocol (TCP/IP) stack and a set of standard libraries for the JVM;

a virtual machine adapted to provide at least one application for rendering the set of streaming content;

a personalization engine adapted to customize the set of streaming content for the one or more users based on a set of preferences received from each one of the one or more users, wherein the set of streaming content is displayed on the flexible substrate in a format enforced by the personalization engine; and wherein the one or more content providers deliver the set of streaming content to the one or more users based on the set of preferences.

8. A method for dynamic content subscription and delivery, said method comprising:

distributing an electronic data delivery apparatus to one or more users, said electronic data delivery apparatus having a hardware binding and one or more pages coupled to said binding, wherein said one or more pages are capable of being turned around the hardware binding, and wherein the electronic data delivery apparatus includes a flexible substrate used to display a set of streaming content, and wherein the electronic data delivery apparatus is a handheld mobile data delivery device distributable to the one or more users, such that the set of streaming content received from the one or more content providers is rendered on the flexible substrate in a specific customized display form for a particular user associated with the electronic data delivery apparatus, wherein each page is made of the flexible substrate and displays the set of streaming content, and wherein each page is a thin, transparent and flexible plastic sheet which includes a plurality of beads that can be of two contrasting colors depending on an applied electric charge to the plurality of beads, associating the electronic data delivery apparatus with a unique identifier, and wherein said unique identifier is used by the one or more content providers to establish the connection with a wireless communication component to send the set of streaming content; and wherein the electronic data delivery apparatus further includes a virtual machine adapted to provide at least one application for rendering the set of streaming content on the flexible substrate of said electronic data delivery apparatus;

a hypervisor that directly interfaces with the virtual machine to execute the application by a CPU of said electronic data delivery apparatus; and a personalization engine adapted to customize the set of streaming content for each one or more users based on a set of preferences received from each one of the one or more users, wherein the set of streaming content is displayed on the flexible substrate in a format enforced by the personalization engine;

transmitting said set of streaming content in real time from the one or more content providers to the electronic data delivery apparatus;

receiving said set of streaming content at the electronic data delivery apparatus; and rendering the set of streaming content on the flexible substrate of the electronic data delivery apparatus for display according to the customized display form tailored to a particular user associated with the electronic data delivery apparatus.

9. The method of claim 8 wherein distributing said electronic data delivery apparatus to one or more users further includes:

loading said hypervisor and said virtual machine onto a storage medium of said electronic data delivery apparatus, wherein the hypervisor operates to eliminate the need for an operating system (OS) on the electronic data delivery apparatus, said hypervisor comprising a thin interface that directly connects a hardware layer and a Java Virtual Machine (JVM), the thin interface providing one or more of the following: device drivers for communicating over a network, device drivers for reading and writing input/output (I/O) operations in physical storage memory, context switching, thread scheduling, transmission control protocol and internet protocol (TCP/IP) stack and a set of standard libraries for the JVM.

10. The method of claim 8 wherein distributing the electronic data delivery apparatus to the one or more users by the one or more content providers further includes:

subscribing the electronic data delivery apparatus by the one or more users in order to receive specified categories of said streaming content.

11. The method of claim 8 wherein receiving said set of streaming content at the electronic data delivery apparatus further includes:

storing said received set of streaming content in a storage medium of said electronic data delivery apparatus.

12. The method of claim 8, further comprising:

periodically re-establishing a wireless connection between the electronic data delivery apparatus and said one or more content providers; and downloading one or more updates to said set of streaming content from the one or more content providers and rendering the one or more updates onto the flexible display substrate.

13. The method of claim 8 wherein rendering the set of streaming content on the flexible substrate further includes:

personalizing display of said set of streaming content according to said one or more users preferences.

14. A computer readable storage medium having a set of instructions embodied thereon, which when executed by one or more processors, cause the execution of:

transmitting a set of streaming content from one or more content providers to an electronic delivery apparatus having a hardware binding and one or more pages coupled to said binding, wherein said one or more pages are capable of being turned around the hardware binding, said electronic delivery apparatus including a flexible substrate adapted to display said set of streaming content and a storage medium situated within the hardware binding, wherein the electronic delivery apparatus is a handheld mobile data delivery device distributable to a one or more users, such that the set of streaming content received from the one or more content providers is rendered on the flexible substrate in a customized display form for a particular user associated with the electronic data delivery apparatus, wherein each page is made of the flexible substrate and displays the set of streaming content, and wherein each page is a thin, transparent and flexible plastic sheet which includes a plurality of beads that can be of two contrasting colors depending on an applied electric charge to the plurality of beads, wherein the electronic data delivery apparatus is associated with a unique identifier, and wherein said unique identifier is used by the one or more content providers to establish the connection with a wireless communication component to send the set of streaming content; and wherein the electronic data delivery apparatus further includes a virtual machine adapted to provide at least one application for rendering the set of streaming content on the flexible substrate of said electronic data delivery apparatus;

a hypervisor that directly interfaces with the virtual machine to execute the application by a CPU of said electronic data delivery apparatus; and a personalization engine adapted to customize the set of streaming content for each one or the users based on a set of preferences received from each user, wherein the set of streaming content is displayed on the flexible substrate in a format enforced by the personalization engine;

receiving said set of streaming content and storing the streaming content into the storage medium of the electronic delivery apparatus; and rendering the set of streaming content onto the flexible display screen of the electronic delivery apparatus according to the customized display form tailored to a particular user associated with the electronic data delivery apparatus.

\* \* \* \* \*

UNITED STATES PATENT AND TRADEMARK OFFICE
CERTIFICATE OF CORRECTION

| | | |
|---|---|---|
| PATENT NO. | : 7,945,638 B2 | Page 1 of 1 |
| APPLICATION NO. | : 11/750258 | |
| DATED | : May 17, 2011 | |
| INVENTOR(S) | : Pozarycki | |

It is certified that error appears in the above-identified patent and that said Letters Patent is hereby corrected as shown below:

In Drawings
On sheet 4 of 5, in figure 4, Box No. 402, line 1, delete "specifc" and insert -- specific --, therefor.

On sheet 4 of 5, in figure 4, Box No. 404, line 1, delete "tranmsmit" and insert -- transmit --, therefor.

On sheet 4 of 5, in figure 4, Box No. 406, line 1, delete "storedonto" and insert -- stored onto --, therefor.

On sheet 5 of 5, in figure 5, Box No. 514, line 1, delete "periodicallyre-established" and insert -- periodically re-established --, therefor.

On sheet 5 of 5, in figure 5, Box No. 514, line 2, delete "andthe" and insert -- and the --, therefor.

In column 3, line 62, delete "Techonologies" and insert -- Technologies --, therefor.

In column 5, line 13, delete "internet" and insert -- internet. --, therefor.

Signed and Sealed this
Eleventh Day of October, 2011

David J. Kappos
*Director of the United States Patent and Trademark Office*